United States Patent
He et al.

(10) Patent No.: US 12,321,080 B2
(45) Date of Patent: Jun. 3, 2025

(54) DOMAIN WALL STRAIGHTENING METHOD OF PERIODICALLY POLED FERROELECTRIC CRYSTAL

(71) Applicant: Guilin Bairui Optoelectronics Technology Co., Ltd., Guilin (CN)

(72) Inventors: Xiaoling He, Guilin (CN); Weidi Zhao, Guilin (CN); Xudong Song, Guilin (CN); Haitao Zhou, Guilin (CN); Changlong Zhang, Guilin (CN); Wenyuan Wu, Guilin (CN); Yanbin Zuo, Guilin (CN); Jinliang Wang, Guilin (CN)

(73) Assignee: Guilin Bairui Optoelectronics Technology Co., Ltd., Guilin (CN)

( * ) Notice: Subject to any disclaimer, the term of this patent is extended or adjusted under 35 U.S.C. 154(b) by 0 days.

(21) Appl. No.: 19/017,542

(22) Filed: Jan. 11, 2025

(65) Prior Publication Data
US 2025/0147384 A1 May 8, 2025

Related U.S. Application Data

(63) Continuation of application No. PCT/CN2024/108721, filed on Jul. 31, 2024.

(30) Foreign Application Priority Data

Jul. 18, 2024 (CN) .......................... 202410964422.4

(51) Int. Cl.
*G02F 1/355* (2006.01)
(52) U.S. Cl.
CPC .......... *G02F 1/3558* (2013.01); *G02F 1/3551* (2013.01)

(58) Field of Classification Search
CPC ............................. G02F 1/3558; G02F 1/3775
See application file for complete search history.

(56) References Cited

U.S. PATENT DOCUMENTS

| | | | | |
|---|---|---|---|---|
| 6,542,285 B1* | 4/2003 | Batchko | ................ | G02F 1/3558 |
| | | | | 359/332 |
| 11,868,022 B2* | 1/2024 | Perlov | .................. | G02F 1/3551 |
| (Continued) | | | | |

OTHER PUBLICATIONS

Gustav Lindgren, Alexandra Peña, Andrius Zukauskas, Charlotte Liljestrand, Bertrand Ménaert, Benoît Boulanger, Carlota Canalias. ,"Thermal stability of ferroelectric domain gratings in Rb-doped KTP". Appl. Phys. Lett. Aug. 24, 2015; 107 (8): 082906. p. 1-4. (Year: 2015).*

(Continued)

*Primary Examiner* — Rhonda S Peace
(74) *Attorney, Agent, or Firm* — Hemisphere Law, PLLC; Zhigang Ma

(57) ABSTRACT

The present invention discloses a domain wall straightening method of a periodically poled ferroelectric crystal. In the present invention, by testing a piezoelectric coefficient of a poled sample, the poling condition of the sample can be judged nondestructively, and the region of uniform poling can be screened out. At the same time, according to the calculation result of a duty cycle, the continuation or stop of poling, and the re-poling after single domain can be judged. The flatness of the domain wall is judged through the change quantity of the piezoelectric coefficient, and the size and the duration of the poling voltage are adjusted in time, to accurate control the poling process, so as to obtain high-quality periodically poled crystals.

4 Claims, 4 Drawing Sheets

(56) References Cited

U.S. PATENT DOCUMENTS

2013/0327110 A1    12/2013  Uchida et al.
2018/0369887 A1    12/2018  Min et al.
2021/0229153 A1     7/2021  Kuroda et al.

OTHER PUBLICATIONS

Catalan G., J. Seidel, R. Ramesh, and J.F. Scott., "Domain Wall Nanoelectronics." Reviews of Modern Physics, vol. 84, Jan.-Mar. 2012. p. 119-156. (Year: 2012).*
CNIPA, Notification to grant patent right for Chinese application CN202410964422.4, Dec. 23, 2024.

* cited by examiner

DOMAIN WALL STRAIGHTENING METHOD OF PERIODICALLY POLED FERROELECTRIC CRYSTAL

TECHNICAL FIELD

The present invention relates to the technical field of preparation of nonlinear optical crystal devices, in particular to a domain wall straightening method of a periodically poled ferroelectric crystal.

BACKGROUND

Frequency conversion of laser can be realized by using the birefringent phase matching of nonlinear optical crystals, such as frequency doubling, difference frequency, sum frequency, optical parametric oscillation, etc. However, the birefringent phase matching can only realize the above functions in a specific angle and a limited wavelength range, cannot use the optimal nonlinear optical coefficient direction of the nonlinear optical crystals, and has large laser walk-off angle and increased device adjustment difficulty. By periodically poling the nonlinear optical crystal with ferroelectric performance, that is, by periodically changing the direction of a nonlinear coefficient, the phase mismatch of the laser when the frequency changes in the crystal can be compensated. This method is called quasi-phase matching. Quasi-phase matching can realize the frequency change in the full transmittance range of the crystal, and can use the direction of the maximum nonlinear optical coefficient of the crystal, thereby overcoming the spatial walk-off effect, improving the frequency conversion efficiency, and greatly expanding the application field of the crystal.

When the crystal is periodically poled, the bending degree of a domain wall seriously affects the conversion efficiency of a device after poling, and an ideal domain wall should be in a completely flat shape. The most common method to observe the domain morphology is a corrosion method. That is, the poled crystal is corroded in a corresponding corrosive agent. By means of the difference in the corrosion rate of a positive domain and a negative domain of the crystal, light and dark stripes can be formed on the crystal surface, and the domain morphology and distribution can be observed through an optical microscope. The advantage of the method is easy observation. However, the method damages the structure of an electrode plated during poling. If the domain distribution is poor, samples cannot continue to be poled, making the samples unusable.

The distribution of the domains can be indirectly reflected by optical methods, such as a method of quadratic harmonics, an electro-optical effect method, a diffraction method, etc. The main principle is to detect the frequency conversion efficiency or the change of light intensity after the laser passes through the crystal. The method has the advantage of no damage to the samples, and the disadvantages that a light-passing end surface of the sample requires precision machining, the best domain distribution region cannot be effectively screened out, and the wavelength of a laser source required for different periods is different, which increases the complexity of detection.

The distribution of the domains can also be indirectly reflected by a piezoelectric property method of ferroelectric crystals. The principle of the method is to measure the piezoelectric coefficients of the crystals before and after poling, and according to the difference of the piezoelectric coefficients, the degree of poling, i.e., a duty cycle, can be calculated. The method has the advantages that there is no damage to the samples, the light-passing surface of the sample requires no precision machining, and the regions with consistent duty cycle distribution can be selected, which is conducive to the selection of the effective regions of the final device. The method has the disadvantage that if domain walls are irregularly bent, as shown in FIG. 1a, although the distribution of the piezoelectric coefficients is consistent, the flatness of the domain walls cannot be truly reflected.

SUMMARY

A purpose of the present invention is to provide a domain reversal characterization method and a domain wall straightening method of a periodically poled ferroelectric crystal to overcome the shortcomings of the prior art. Specifically, the domain reversal situation is characterized based on the piezoelectric property method and in combination with the change quantity of the piezoelectric coefficients, and a domain wall straightening method is provided, so as to obtain high-quality periodic poling results.

In order to achieve the above purpose, the present invention adopts the following technical solution:

A domain wall straightening method of a periodically poled ferroelectric crystal comprises the following steps:

step 1: making a negative polarity surface of a sample to be poled upward by a quasi-static test method, with a piezoelectric coefficient of $d_s$, and $d_s>0$, and then periodically poling the sample;

placing one surface of the poled sample on an insulating plate for testing a piezoelectric coefficient $d_c$, and then placing the sample on the insulating plate in reverse for testing a piezoelectric coefficient $d_r$;

when the absolute values of $d_c$ and $d_r$ are both greater than $d_s/2$, continuing to pole the sample;

when the absolute value of the tested piezoelectric coefficient is less than $d_s/2$, if a difference in the absolute values of $d_c$ and $d_r$ is less than 20%, judging that a poled reversed domain penetrates through the entire crystal, and obtaining a domain penetrated crystal for use;

if the difference in the absolute values of $d_c$ and $d_r$ is greater than 20%, judging that the reversed domain does not penetrate through the entire crystal, stopping the poling, conducting single domain for the sample, and conducting periodic poling again;

step 2: placing the domain penetrated crystal in step 1 upward in the original negative polarity direction instead of on the insulating plate by the quasi-static test method, and testing a piezoelectric coefficient $d_p$;

step 3: calculating the duty cycle of a test region by a formula $D=(d_p+d_s)/2d_s$; wherein if $d_p>0$, the duty cycle of the reversed domain is 1-D, which indicates that the area of the reversed domain region is smaller than the area of an unreversed domain region, and if $d_p<0$, the duty cycle of the reversed domain is D, which indicates that the area of the reversed domain region is larger than the area of the unreversed domain region;

step 4: selecting multiple points on the poled sample for testing the piezoelectric coefficient, and calculating the duty cycle distribution condition of different regions of the poled sample according to step 3;

step 5: according to the results obtained from step 3, if the duty cycle D is greater than a designed duty cycle by 20%, conducting single domain for the sample and conducting periodic poling again; and if the duty cycle D is greater than 0 but less than 20% than the designed duty cycle, continuing to pole the sample, and adjusting the size of poling voltage according to the change quantity $\Delta d_p$ of the piezoelectric coefficient $d_p$;

step 6: testing equidistant regions on a same coordinate axis; if 2% $d_s \geq \Delta d_p \geq 0.5\% \ d_s$ in any region, indicating that the transverse growth rate of reversal is in a reasonable range, and indicating that the domain wall tends to be flat; and according to step 5, judging whether to continue poling, and finally making the duty cycle D and the designed duty cycle reach an error range of ±0.5%;

if $\Delta d_p > 2\% \ d_s$ in any region, reducing the voltage; taking out the sample after poling for testing the piezoelectric coefficient; and repeating the above calculation to judge whether to continue the poling until the duty cycle reaches 50%;

if $\Delta d_p < 0.5\% \ d_s$ in any region, increasing the voltage; taking out the sample after poling for testing the piezoelectric coefficient; and repeating the above calculation to judge whether to continue the poling until the duty cycle reaches 50%.

Preferably, the sample in step 1 is a potassium titanyl phosphate crystal with a thickness ≥0.5 mm, and a reversed domain period is ≥1 μm.

Preferably, a frame type periodic electrode is plated on the sample −Z surface; electrode width is ≤1/2Λμm; Λ is the reversed domain period; the duty cycle of the electrode is ≤50%; and a complete electrode is plated on the +Z surface.

Taking 46μm period as an example, the theoretical width of the reversed domain is 23 μm, and the electrode width is generally less than the theoretical width of the reversed domain in order to reserve space for expansion.

Preferably, periodic poling conditions: the pulse voltage is 3 kV/mm, the pulse width is 46 ms, and the number of pulses is ≥1.

When the voltage is greater than a coercive field (the theoretical coercive field of KTP is 2.1 kv/mm), poling can occur, and the specific value is determined according to the period and actual situations; and the pulse width can correspond directly to the period.

According to the above technical solution, compared with the prior art, the present invention has the following beneficial effects:

By testing the piezoelectric coefficient of the poled sample, the poling condition of the sample can be judged nondestructively, and the region of uniform poling can be screened out. At the same time, according to the calculation results of the duty cycle, the continuation or stop of poling, and the re-poling after single domain can be judged. The flatness of the domain wall is judged through the change quantity of the piezoelectric coefficient, and the size and the duration of the poling voltage are adjusted in time, to accurate control the poling process, so as to obtain high-quality periodically poled crystals.

DESCRIPTION OF DRAWINGS

To more clearly describe the technical solutions in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

Figure 2:
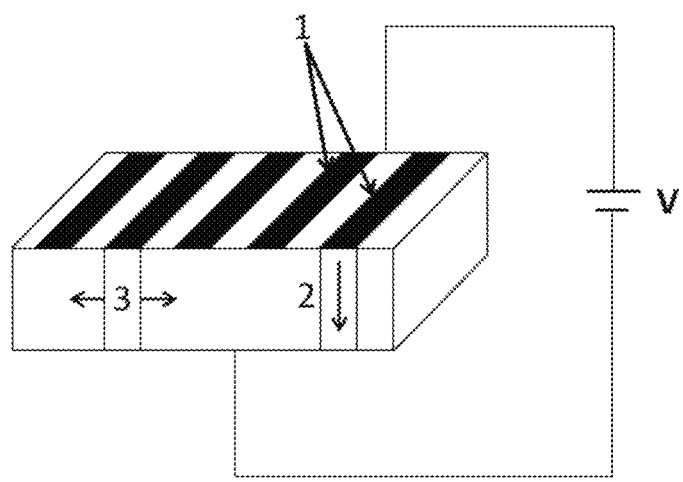
Figure 3:
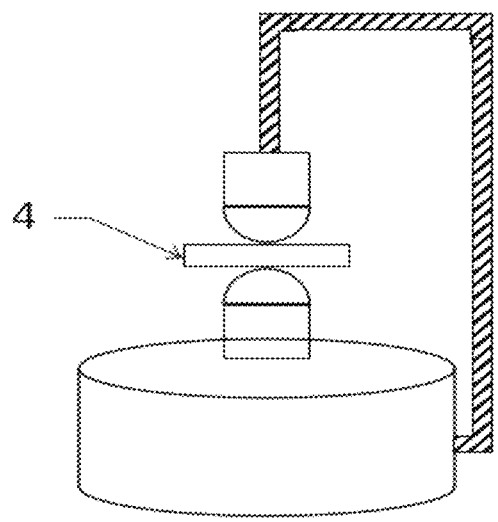
Figure 4:
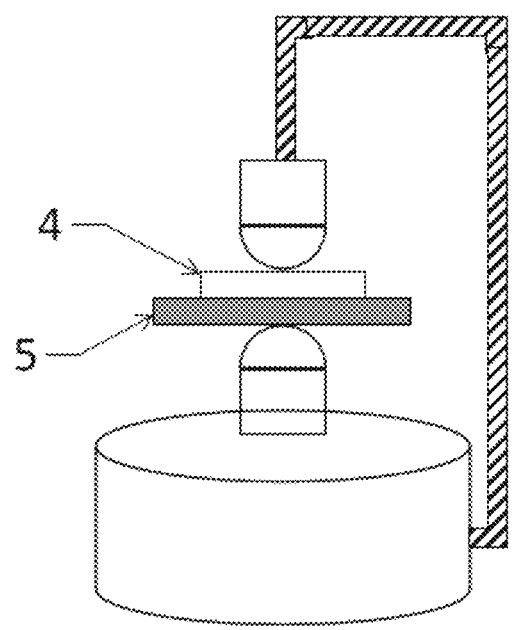

Wherein a is a curved domain wall diagram of an actual poled sample, b is a straight domain wall diagram of the actual poled sample, and c is a domain wall diagram of the actual poled sample without merging the center;

FIG. 2 is a schematic diagram of periodic poling;

Wherein 1 is a periodic electrode, 2 is a schematic diagram of a longitudinal growth direction, and 3 is a schematic diagram of a transverse growth direction;

FIG. 3 is a schematic diagram of a piezoelectric coefficient of a test sample;

Wherein 4 is a ferroelectric crystal;

FIG. 4 is a schematic diagram of a piezoelectric coefficient when one surface of a test sample is placed on an insulating plate;

Wherein 4 is a ferroelectric crystal, and 5 is an insulating plate.

DETAILED DESCRIPTION

The technical solutions in embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiment 1

Figure 1:
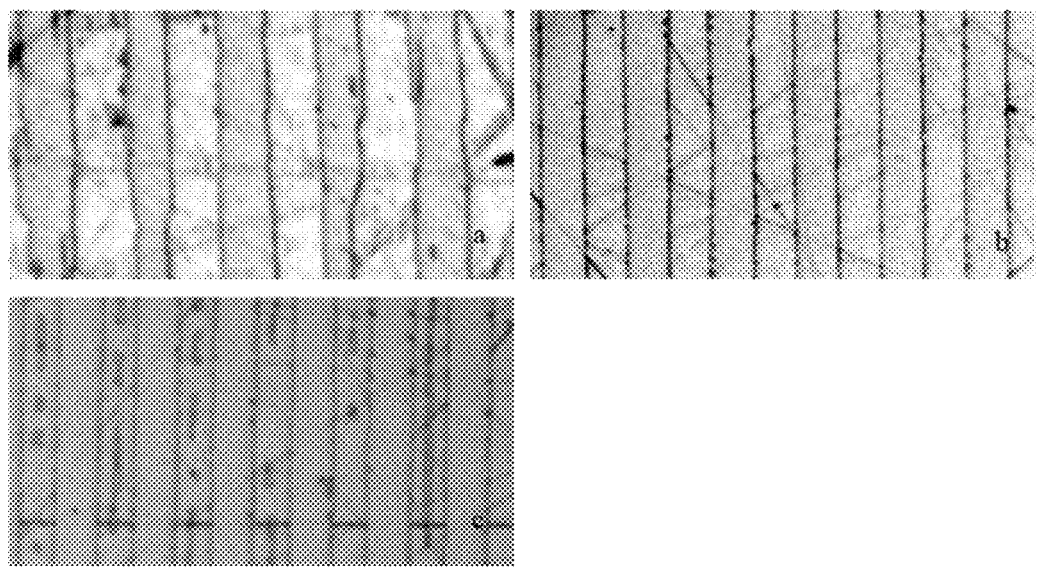
FIG. 1 shows domain wall diagrams of a poled sample.

FIG. 2 is a schematic diagram of an electrode structure and poling for poling a ferroelectric crystal. As shown in the figure, a periodic electrode structure of the present invention is an electrode 1 as shown in FIG. 1, and the poling voltage is loaded on the crystal in the vertical direction where the electrode 1 is located.

FIG. 3 and FIG. 4 are schematic diagrams of testing the piezoelectric coefficient of the ferroelectric crystal. As shown in the figures, the ferroelectric crystal of the present invention is shown in FIG. 4, and the insulating plate is shown in FIG. 4.

The present embodiment provides a domain wall straightening method of a periodically poled ferroelectric crystal, comprising the following steps:

step 1: making a negative polarity surface of a sample to be poled upward by a quasi-static test method, with a piezoelectric coefficient of $d_s$, and $d_s > 0$, and then periodically poling the sample;

In the present embodiment, the periodically poled sample is a potassium titanyl phosphate crystal with a thickness of 1 mm; the length and width dimensions can be cut to any size as required; and a reversed domain period is 46 μm.

A frame type periodic electrode is plated on the potassium titanyl phosphate crystal-Z surface; electrode width is 15 μm; the duty cycle of the electrode is 32.6%; and a complete electrode is plated on the +Z surface.

Periodic poling conditions: the pulse voltage is 3 kV/mm, the pulse width is 46 ms, and the number of pulses is ≥1.

When the number of the pulses is 3, the poling voltage is turned off and the potassium titanyl phosphate crystal is taken out. The potassium titanyl phosphate crystal is placed on the insulating plate by a quasi-static test method for testing the piezoelectric coefficient $d_c$; and then the sample is reversely placed on the insulating plate for testing the piezoelectric coefficient $d_r$. When the absolute values of $d_c$ and $d_r$ are both greater than $d_s/2$, the sample is continued to be poled. When the absolute value of the tested piezoelectric coefficient is less than $d_s/2$, if a difference in the absolute values of $d_c$ and $d_r$ is less than 20%, a poled reversed domain is judged to penetrate through the entire crystal. If the difference in the absolute values of $d_c$ and $d_r$ is greater than 20%, the reversed domain is judged not to penetrate through the entire crystal; the poling is stopped; single domain is conducted for the sample; and periodic poling is conducted again.

Step 2: placing the domain penetrated crystal upward in the original negative polarity direction instead of on the insulating plate by the quasi-static test method, and testing a piezoelectric coefficient $d_p$.

Step 3: selecting multiple points on the poled sample for testing the piezoelectric coefficient, calculating the duty cycle of a test region by a formula $D=(d_p+d_s)/2d_s$, and calculating the duty cycle distribution condition of different regions of the poled sample. If $d_p>0$, the duty cycle of the reversed domain is 1-D, which indicates that the area of the reversed domain region is smaller than the area of an unreversed domain region, and if $d_p<0$, the duty cycle of the reversed domain is D, which indicates that the area of the reversed domain region is larger than the area of the unreversed domain region.

Step 4: according to the results obtained from step 3, if the duty cycle D is greater than a designed duty cycle by 20%, conducting single domain for the sample and conducting periodical poling again; and if the duty cycle D is greater than 0 but less than 20% than the designed duty cycle, continuing to pole the sample, and adjusting the size and duration of poling voltage according to the change quantity $\Delta d_p$ of the piezoelectric coefficient $d_p$.

The reversed domain after periodic poling is shown in FIG. 1. FIG. 1a is a diagram of a curved domain wall; FIG. 1b is a diagram of a flat domain wall; and FIG. 1c is a diagram of a domain wall without merging the center. When the crystal is periodically poled, the longitudinal growth rate of the domain is much higher than the transverse growth rate, and the ratio of the speed is about 100-1000:1, as shown in FIG. 2 which is a schematic diagram of periodic poling. If an electric field with constant pulse width is applied, the higher the electric field is, the larger the ratio of the longitudinal growth rate to the transverse growth rate is. The higher the transverse growth rate of the reversed domain is, the easier the domain wall is to bend. On the contrary, if the voltage is too low, the transverse growth rate of the reversed domain is too slow, and the center is extremely easy not to merge. The change quantity $\Delta d_p$ of the piezoelectric coefficient $d_p$ can indirectly reflect the transverse growth rate of the reversed domain.

Step 5: testing the piezoelectric coefficient $d_p$ of equidistant regions on a same coordinate axis; if the change quantity $\Delta d_p$ of $d_p$ compared with the last change in any region satisfies $2\% \, d_s \geq \Delta d_p \geq 0.5\% \, d_s$, indicating that the transverse growth rate of reversal is in a reasonable range, and indicating that the domain wall tends to be flat; and according to the calculation result of the duty cycle, judging whether to continue poling, and finally making the duty cycle D and the designed duty cycle reach an error range of ±0.5%.

if $\Delta d_p > 2\% \, d_s$ in any region, reducing the poling pulse voltage as 2.8 kV/mm, the pulse width as 4.6 ms, and the number of pulses as 1; taking out the potassium titanyl phosphate crystal after poling for testing the piezoelectric coefficient; and repeating the above calculation to judge whether to continue the poling until the duty cycle reaches 50%;

if $\Delta d_p < 0.5\% \, d_s$ in any region, increasing the voltage as 3.2 kV/mm, the pulse width as 4.6 ms, and the number of pulses as 1; taking out the potassium titanyl phosphate crystal after poling for testing the piezoelectric coefficient; and repeating the above calculation to judge whether to continue the poling until the duty cycle reaches 50%.

According to the embodiments of the present invention, the problem of unflatness of the domain wall in the process of periodic poling of the ferroelectric crystal can be solved, so as to improve the quality of the reversed domains, make the domains show periodic arrangement, make the duty cycle close to 50%, and effectively improve the optical conversion efficiency.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein.

What is claimed is:

1. A domain wall straightening method of a periodically poled ferroelectric crystal, comprising the following steps:
   step 1: making a negative polarity surface of a sample to be poled upward by a quasi-static test method, with a piezoelectric coefficient of $d_s$, and $d_s>0$, and then periodically poling the sample;
   placing one surface of the poled sample on an insulating plate for testing a piezoelectric coefficient $d_c$, and then placing the sample on the insulating plate in reverse for testing a piezoelectric coefficient $d_r$;
   when the absolute values of $d_c$ and $d_r$ are both greater than $d_s/2$, continuing to pole the sample;
   when the absolute value of the tested piezoelectric coefficient is less than $d_s/2$, if a difference in the absolute values of $d_c$ and $d_r$ is less than 20%, judging that a poled reversed domain penetrates through the entire crystal, and obtaining a domain penetrated crystal for use;
   if the difference in the absolute values of $d_c$ and $d_r$ is greater than 20%, judging that the reversed domain does not penetrate through the entire crystal, stopping the poling, conducting single domain for the sample, and conducting periodic poling again;
   step 2: placing the domain penetrated crystal in step 1 upward in the original negative polarity direction instead of on the insulating plate by the quasi-static test method, and testing a piezoelectric coefficient $d_p$;
   step 3: calculating the duty cycle of a test region by a formula $D=(d_p+d_s)/2d_s$; wherein if $d_p>0$, the duty cycle of the reversed domain is 1-D, which indicates that the area of the reversed domain region is smaller than the area of an unreversed domain region, and if $d_p<0$, the duty cycle of the reversed domain is D, which indicates that the area of the reversed domain region is larger than the area of the unreversed domain region;

step 4: selecting multiple points on the poled sample for testing the piezoelectric coefficient, and calculating the duty cycle distribution condition of different regions of the poled sample according to step 3;

step 5: according to the results obtained from step 3, if the duty cycle D is greater than a designed duty cycle by 20%, conducting single domain for the sample and conducting periodic poling again; and if the duty cycle D is greater than 0 but less than 20% than the designed duty cycle, continuing to pole the sample, and adjusting the size of poling voltage according to the change quantity $\Delta d_p$ of the piezoelectric coefficient $d_p$;

step 6: testing equidistant regions on a same coordinate axis; if $2\% d_s \geq \Delta d_p \geq 0.5\% d_s$ in any region, indicating that the transverse growth rate of reversal is in a reasonable range, and indicating that the domain wall tends to be flat; and according to step 5, judging whether to continue poling, and finally making the duty cycle D and the designed duty cycle reach an error range of ±0.5%;

if $\Delta d_p > 2\% d_s$ in any region, reducing the voltage; taking out the sample after poling for testing the piezoelectric coefficient; and repeating the above calculation to judge whether to continue the poling until the duty cycle reaches 50%;

if $\Delta d_p < 0.5\% d_s$ in any region, increasing the voltage; taking out the sample after poling for testing the piezoelectric coefficient; and repeating the above calculation to judge whether to continue the poling until the duty cycle reaches 50%.

2. The domain wall straightening method of the periodically poled ferroelectric crystal according to claim 1, wherein the sample in step 1 is a potassium titanyl phosphate crystal with a thickness ≥0.5 mm, and a reversed domain period is ≥1 μm.

3. The domain wall straightening method of the periodically poled ferroelectric crystal according to claim 1, wherein a frame type periodic electrode is plated on the sample −Z surface; electrode width is ≤1/2Λμm; Λ is the reversed domain period; the duty cycle of the electrode is ≤50%; and a complete electrode is plated on the +Z surface.

4. The domain wall straightening method of the periodically poled ferroelectric crystal according to claim 1, wherein periodic poling conditions: the pulse voltage is 3 kV/mm, the pulse width is 46 ms, and the number of pulses is ≥1.

* * * * *